July 29, 1924.  
F. J. KEPPELER  
1,502,725  
ATTACHMENT FOR SAW FILING AND SETTING MACHINES  
Filed Aug. 6, 1923  2 Sheets-Sheet 1
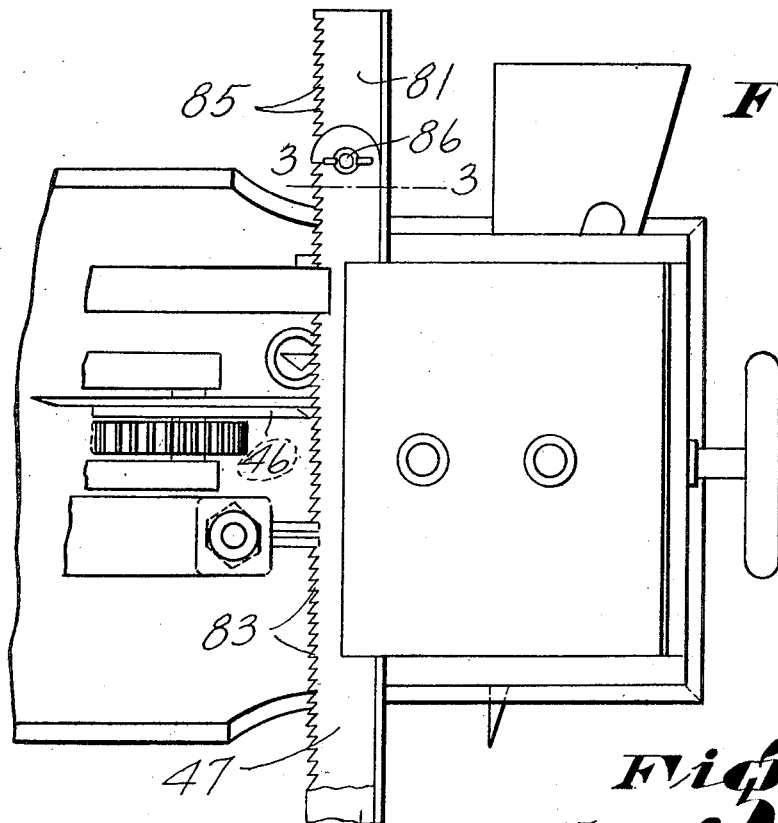
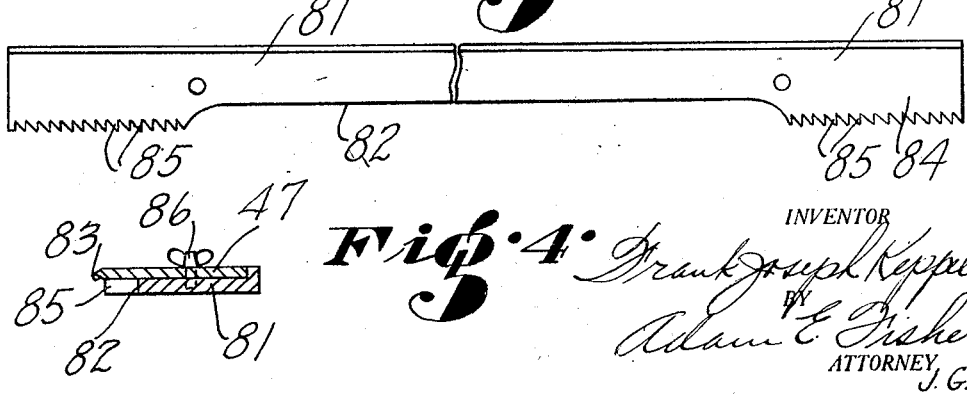
INVENTOR  
Frank Joseph Keppeler  
BY Adam E. Fisher  
ATTORNEY  
J. G.

July 29, 1924.

F. J. KEPPELER 1,502,725

ATTACHMENT FOR SAW FILING AND SETTING MACHINES

Filed Aug. 6, 1923

Inventor.
Frank Joseph Keppeler
BY
Adam E. Fisher,
ATTORNEY.

Patented July 29, 1924.

1,502,725

UNITED STATES PATENT OFFICE.

FRANK JOSEPH KEPPELER, OF MILWAUKEE, WISCONSIN.

ATTACHMENT FOR SAW FILING AND SETTING MACHINES.

Application filed August 6, 1923. Serial No. 655,937.

*To all whom it may concern:*

Be it known that I, FRANK JOSEPH KEPPELER, a citizen of the United States, residing in the city of Milwaukee, county of Milwaukee, and State of Wisconsin, have invented new and useful Improvements in Attachments for Saw Filing and Setting Machines, of which the following is a specification, reference being had to the accompanying drawings.

This invention is in the way of an attachment for the invention of Anton Keppeler on a saw filing and setting machine, patented to him by United States Letters Patent #615,280, dated December 6, 1898, and the object is to provide an attachment in the nature of a blade carrier for the machine described in that patent, whereby all of the teeth of the saw may be set and sharpened.

In the drawing

Figure 1 is a plan view of the improvement incorporated upon the old machine, the old structure being shown in dotted lines, while the improvement is shown in solid lines;

Figure 2 is a top plan view of the blade carrier with the blade inserted;

Figure 3 is a plan view of the blade carrier alone;

Figure 4 is a sectional view on the line 3—3 in Figure 1;

Figure 5:
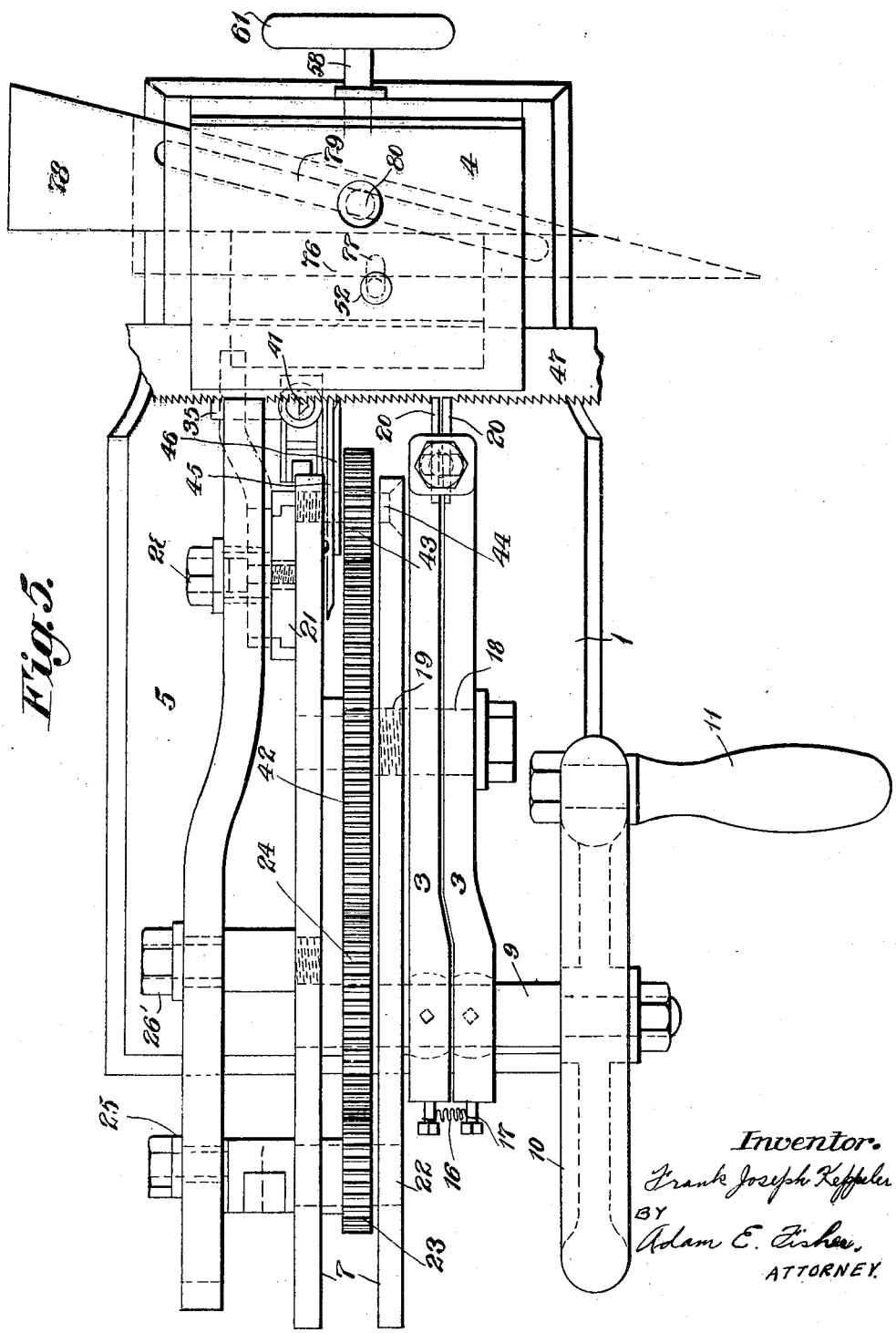
Figure 5 is a plan view of the machine described in the original patent referred to, and whereon this improvement has been incorporated.

Inasmuch as the present invention is an improved attachment for the old machine, it is thought advisable in this specification to use reference numerals in series with those employed in the original patent, wherein the last reference numeral employed is "80."

In the operation of the original machine, the wheel 10 is rotated, whereby the train of intermeshing gears 23, 24, 42, 43, are set in motion, causing the file 41 and setting bits 20 to operate, and the feeding elements 45 and 46, for feeding the blade 47 through the machine. But it is obvious from inspection of Figure 5 that this feeding mechanism is spaced inwardly to such an extent that it renders the machine ineffective for sharpening the outer-most or end teeth of the saw, since the setting bits 20 will reach the end of the blade 47 first, and thus stop the further operation of the machine as a whole, including the file 41.

The invention consists in a blade carrier 81, made of a thin and narrow strip of sheet metal, of a width approximately that of the standard meat saw blade 47. This blade carrier is preferably curved inwardly along the edge 82 which lies next to the teeth 83 of the saw, so as to allow these teeth to stand out clear and free from the carrier at the medial portion of the carrier, while at the ends, the edges of the saw and carrier coincide. Then at the right hand end 84 of the carrier, that is to say, the end which travels into the machine in the process of sharpening and setting, auxiliary teeth 85 are cut in exact similitude with the teeth 83 of the saw itself. Light screw clamps 86 are then provided, adapted to releasably secure the blade 47 to the carrier 81.

In use, the saw blade is secured to the carrier with the teeth at the right hand end thereof exactly registering with the auxiliary teeth of the carrier at that end; and the feeding segment 46 of the machine proper will then continue to act upon these auxiliary teeth 85, even after the teeth 83 of the saw have passed through the feeding segment; and so all of the teeth 83 of the saw will be fed up to and through the setting dies 20 past the file 41 for sharpening. This attachment, therefore, enables the sharpening of all the teeth of the saw.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. A device of the kind described, comprising a thin, narrow strip of metal, inwardly curved medially along one edge, and having teeth cut at one end thereof.

2. A blade carrier for saw filing machines, comprising a thin, narrow strip of metal curved inwardly along one edge and having teeth cut at one end thereof adapted to register with the teeth of the saw; and means for securing the saw blade thereto.

FRANK JOSEPH KEPPELER.

Witnesses:
   GEO. WALLERY,
   H. G. KREITER.